United States Patent [19]

Ogawa

[11] 3,944,734
[45] Mar. 16, 1976

[54] VIDEO PROJECTING SYSTEM
[75] Inventor: Yoshio Ogawa, Yokohama, Japan
[73] Assignee: Sony Corporation, Tokyo, Japan
[22] Filed: Dec. 23, 1974
[21] Appl. No.: 535,844

[52] U.S. Cl............................... 178/7.91; 178/7.91
[51] Int. Cl.² ..................... H04N 5/74; H04N 5/645
[58] Field of Search............................ 178/7.9, 7.91

[56] References Cited
UNITED STATES PATENTS
2,509,508  5/1950  Kalff ................................. 178/7.91
3,036,154  5/1962  Harman ............................... 178/7.9

*Primary Examiner*—Robert L. Griffin
*Assistant Examiner*—Edward L. Coles
*Attorney, Agent, or Firm*—Lewis H. Eslinger; Alvin Sinderbrand

[57] ABSTRACT

A video projecting system having a cabinet with one end being opened, a screen in the cabinet and its upper portion, a movable side board attached to the cabinet at the lower side of its opening, and a projector and a mirror both attached to the movable side board on its inner surface, in which when the movable side board is drawn out a picture from the projector is reflected on the mirror and then projected onto the screen.

4 Claims, 1 Drawing Figure

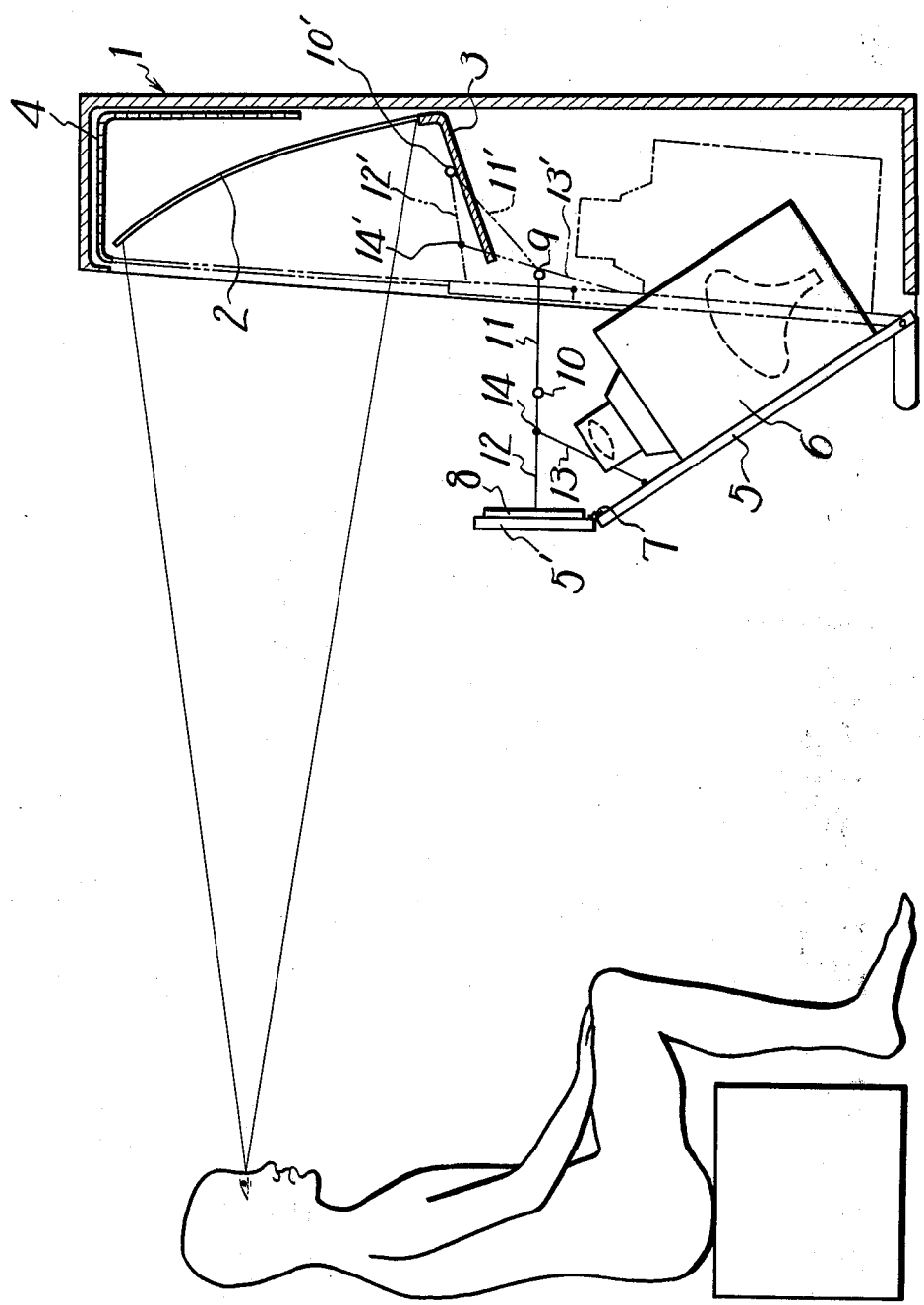

VIDEO PROJECTING SYSTEM

BACKGROUND OF THE INVENTION

1. Field of the Invention

The present invention relates generally to a video projecting system, and more particularly to an improved video projecting system.

2. Description of the Prior Art

A so-called video projecting system has been proposed for projecting a picture formed on a television receiver (which will be hereafter referred to as a TV picture screen) onto a screen so as to observe the TV picture screen like a movie picture screen. However, since the prior art video projecting system consists of a projector proper and a screen and the projector is located at the center of a room when it is used, the projector will be in views way and the viewers often feel a sense of oppression.

Further, in the case where the video projecting system is conveyed from a maker to a user, its components must be wrapped separately, which results in trouble and high cost. In addition, for this reason it is difficult to reduce its conveyance cost.

Further, in addition to high conveyance fee, there may be a risk that the screen of the video projecting system is damaged.

SUMMARY OF THE INVENTION

According to the present invention, there is provided a video projecting system which comprises a cabinet with its one end being opened, a screen attached to the cabinet in its and at its upper side, a movable side board mounted on the cabinet at the lower side of the open end of the cabinet, and a projector and a mirror mounted on the side board at its inner surface, and in which when the side board is drawn out a picture from the projector is reflected on the mirror and then is projected onto the screen.

Accordingly, it is an object of the present invention to provide a novel video projecting system free from the deflects inherent in the prior art.

It is another object of the invention to provide a video projector system which does not spoil the beauty of a room where the video projecting system is located but increases the same.

It is a further object of the invention to provide a video projecting system which can prevent unnecessary reflected light on a floor from being reached to a screen by its lid or side board.

The other objects, features and advantages of the invention will become apparent from the following descreption taken in conjunction with the accompanying drawing.

BRIEF DESCRIPTION OF THE DRAWING

An attached FIGURE is a schematic cross-sectional diagram showing an embodiment of the video projecting system according to the present invention.

DESCRIPTION OF THE PREFERRED EMBODIMENT

With reference to the attached FIGURE, an embodiment of the video projecting system according to the present invention will be hereinafter described. In the FIGURE, reference numeral 1 designates a cabinet; 2 a screen fixedly located in the cabinet 1; 3 a fixed plate located in the cabinet 1 and supporting the screen 2; 4 a movable shutter which may cover the front portion of the cabinet 1 at the front of the screen 2, as shown by two-dot chain lines when the video projecting system is not used; 5 a movable lid or side board which may be inclined at the front side of the cabinet 1 when the projecting system is used; 6 a projector which is integrally fixed to the movable side board 5 on its inner surface; 5' a rotatable lid or side board which is rotatably connected through a hinge 7 to the inside board 5; 8 a mirror attached to the side board 5' on its inner surface; 9 a fixed fulcrum to the cabinet 1; 10 a movable fulcrum; 11 and 12 stays, the stay 11 being stretched between the fulcrums 9 and 10, the stay 12 being rotatably attached at its one end to the movable side board 5' and at its other end to the movable fulcrum 10 and being so selected in its length that the angle of the mirror 8 attached to the side board 5' is made suitable relative to the projector 6 and the screen 2 therebetween when the video projecting system is actually used; and 13 a stay which is rotatably attached at its one end to the movable side board 5 and at its other end to a fulcrum 14 provided at a mid way of the stay 12.

The attached FIGURE shows the video projecting system of the invention in a used condition. In such a condition, the light emitted from the projector 6 is reflected on the mirror 8, and then projected onto the screen 2 to form a picture thereon. When the video projecting system is not used, if the movable fulcrum 10 is moved from the lower side to the upper side and at the same time the movable side board 5 is pushed inwards, the stay 11 is rotated in the clockwise direction in the FIGURE about the fixed fulcrum 9 and simultaneously the movable side board 5' is made gradually free from the restriction of the stay 12 to become parallel to the movable side board 5. Finally, as shown by two-dot chain lines in the FIGURE, the movable side boards 5 and 5' and the projector 6 are accommodated or housed in the cabinet 1 completely. In this case, the stays 11 and 12 are moved to locations shown by reference numerals 11' and 12'; the movable fulcrum 10 to 10'; the stay 13 to 13'; and the fulcrum 14 to 14', respectively, and then they are folded.

If the video projecting system will be used again, the above mentioned processes will be repeated reversely. Thus, the video projecting system can be brought to the condition shown in the FIGURE by the solid lines easily.

As described above, according to the present invention, it is no need when used to locate the video projecting system at a predetermined position such as the center of a room, so that the video projecting system never becomes in viewers' way, the views never feel a sense of oppression, and in addition when accommodated it is sufficient to urge the movable side boards 5 and 5' inwards.

Further, with the invention, the wrapping and the conveyance of the video projecting system can be much simplified, and hence their costs are reduced. In addition, when the video projecting system is located in a room, it may increase the look of the room in association with its column type.

Still further, when the video projecting system of the invention is actually used, its lids or side boards are inclined in its front direction, so that unnecessary lights reflected on the floor of a room are prevented by the side boards from being reached to the screen from the floor of the room. Therefore, viewer's sense of sight is prevented from being fatigued and the projected picture onto the screen can be looked at clearly by the viewer.

The above description is given on only one preferred embodiment of the invention, but it will be apparent that many modifications and variations could be effected by one skilled in the art without departing from the spirits or scope of the novel concepts of the present invention.

I claim as my invention:

1. A video projecting apparatus comprising an upright cabinet having an opening at the front thereof; a screen mounted within the upper portion of said cabinet so as to be viewable through the corresponding portion of said opening of the cabinet; a front wall member pivotally mounted, at its lower end, on said front of the cabinet for swinging movement between a closed position, in which said front wall member closes the lower portion of said opening, and an operative position, in which said front wall member is inclined upwardly and outwardly from said front of the cabinet for preventing the impingement on the screen of light that is reflected upwardly from in front of the front wall member; a projector mounted on said front wall member in back of the latter for projecting a video image upwardly and forwardly in respect to said screen when said front wall member is in said operative position; and a mirror mounted at the upper portion of said front wall member for reflecting said video image from said projector against said screen when said front wall member is in said operative position.

2. A video projecting apparatus according to claim 1; in which said screen is inclined downwardly and rearwardly within said upper portion of the cabinet.

3. A video projecting apparatus according to claim 1; in which said mirror is carried by an extension of said front wall member which is pivotally secured to said upper portion of the front wall member; and further comprising link means connecting said cabinet, front wall member and extension for disposing said extension substantially coplanar with said front wall member when the latter is in said closed position and for tilting said extension and mirror rearwardly relative to the plane of said front wall member when the latter is in said operative position.

4. A video projecting apparatus according to claim 3; further comprising closure means for closing said opening at the front of the cabinet above said extension when said front wall member is in said closed position.

* * * * *